United States Patent [19]
Kira et al.

[11] Patent Number: 5,379,631
[45] Date of Patent: Jan. 10, 1995

[54] FLATNESS DETECTOR

[75] Inventors: Yoichi Kira; Kenji Misumi, both of Yokohama, Japan

[73] Assignee: Ishikawajima-Harima Jukogyo Kabushiki Kaisha, Tokyo, Japan

[21] Appl. No.: 29,571

[22] Filed: Mar. 11, 1993

[30] Foreign Application Priority Data

Mar. 17, 1992 [JP] Japan .................. 4-14231[U]

[51] Int. Cl.$^6$ .......................................... G01B 13/22
[52] U.S. Cl. .......................................... 73/37.5; 72/17; 72/10
[58] Field of Search ............ 73/37.5, 37, 37.6, 37.7; 72/11, 16, 8, 9, 10, 12, 13, 17, 18

[56] References Cited

U.S. PATENT DOCUMENTS

| | | |
|---|---|---|
| 3,499,306 | 3/1970 | Pearson ............. 72/17 |
| 3,587,268 | 6/1971 | Bricmont et al. ..... 72/13 |
| 3,877,270 | 4/1975 | Marten .............. 72/8 |
| 3,990,284 | 11/1976 | Barten .............. 72/9 |
| 4,366,720 | 1/1983 | Berger et al. ....... 72/17 |
| 4,400,957 | 8/1983 | Carlstedt et al. .... 72/8 |
| 4,428,244 | 1/1984 | Takeda .............. 72/17 |
| 4,478,062 | 10/1984 | Huzyak .............. 72/11 |
| 4,750,343 | 6/1988 | Richter et al. ...... 72/17 |

FOREIGN PATENT DOCUMENTS

| | | |
|---|---|---|
| 2146814 | 3/1973 | Germany . |
| 3289510 | 12/1991 | Japan . |
| 1160112 | 7/1969 | United Kingdom . |
| 944698 | 7/1982 | U.S.S.R. . |

OTHER PUBLICATIONS

Japanese utility model 2nd publication, Jan. 7, 1992, #4-249.
Patent Abstract of Japan, vol. 16, No. 123 (P-1330) Mar. 1992 & JP-A-32 89 510 (Showa Alum) Dec. 19, 1991.
Japanese Utility Model 2nd Publication No. 4-249 Published on Jan. 7, 1992, Abridged Translation.

*Primary Examiner*—Hezron E. Williams
*Assistant Examiner*—Michael J. Brock
*Attorney, Agent, or Firm*—Oblon, Spivak, McClelland, Maier & Neustadt

[57] ABSTRACT

A flatness detector has a fixed shaft and a plurality of rotary rings loosely fitted over the shaft and adjacent to each other along an axis of the shaft, a pneumatic bearing being defined by a gap between the rings and the shaft. The shaft is provided with heating means for heating the shaft to prevent shrinkage of a rolled strip due to temperature variations of the strip as well as bending means at opposite ends of the shaft for bending the shaft in a predetermined direction so as to prevent formation of lengthwise wrinkles on the rolled strip.

3 Claims, 2 Drawing Sheets

FLATNESS DETECTOR

BACKGROUND OF THE INVENTION

The present invention relates to a flatness detector for detecting flatness of a strip such as rolled steel.

In rolling a metal plate or the like into a strip, there has been employed a control system in which tension distribution along width of the strip is measured. Based on the measured distribution, flatness of the strip is detected and control is made to improve the flatness.

A conventional flatness detector comprises a fixed shaft and a plurality of rotary rings loosely fitted over the shaft and adjacent to each other along an axis of the shaft, compressed air being supplied to a gap between the rings and the shaft to thereby provide a pneumatic bearing. With this flatness detector, any variation of the gap is detected in terms of pressure variations which in turn are used to detect the flatness of the, strip.

With the conventional flatness detector, the compressed air supplied to the pneumatic bearing is usually dry air so that the shaft and the rings fitted thereover are super cooled by the dry air whereas the moving rolled strip is hot. As a result, when the hot strip contacts the supercooled rings to receive sudden temperature variations, lengthwise wrinkles are produced on the strip due to shrinkage of the strip.

Such lengthwise wrinkles on the strip may be prevented by increasing tension of the strip upon rolling. However, this would be disadvantageous in that the strip being rolled tends to be torn, resulting in lowering of productivity.

In order to prevent the lengthwise wrinkles, it may be also envisaged or contemplated that a flatness detector is finished to have a crowned contour so as to vary the tension imparted to the strip along the width of the strip and suppress production of the lengthwise wrinkles on the strip. This idea has been already applied to conventional single rolls.

However, it is extremely difficult to make crowned a flatness detector having a plurality of mutually adjacent rotary rings as mentioned above.

The present invention was made to overcome the above problems encountered in the prior art and has for its object to provide a flatness detector which can substantially eliminate production of lengthwise wrinkles on a strip.

BRIEF SUMMARY OF THE INVENTION

According to a flatness detector of the present invention having a fixed shaft and a plurality of rotary rings loosely fitted over the shaft and adjacent to each other along an axis of the shaft, a pneumatic bearing being defined by a gap between the rings and the shaft, the above-mentioned problems are overcome by the provision of means for bending the fixed shaft in a predetermined direction.

The shaft is provided with heating means which can increase temperatures of the shaft and the rings to a level substantially equal to the moving rolled strip. As a consequence, shrinkages of the rolled strip upon contact with the rings can be prevented.

The shaft is bent in a predetermined direction by the bending means at opposite ends of the shaft so that the contour of the flatness detector can be curved just like being crowned. As a result, any tension imparted to the strip can be varied along the width of the strip to thereby suppress formation of lengthwise wrinkles on the strip.

DETAILED DESCRIPTION OF THE PREFERRED EMBODIMENT

Figure 1:
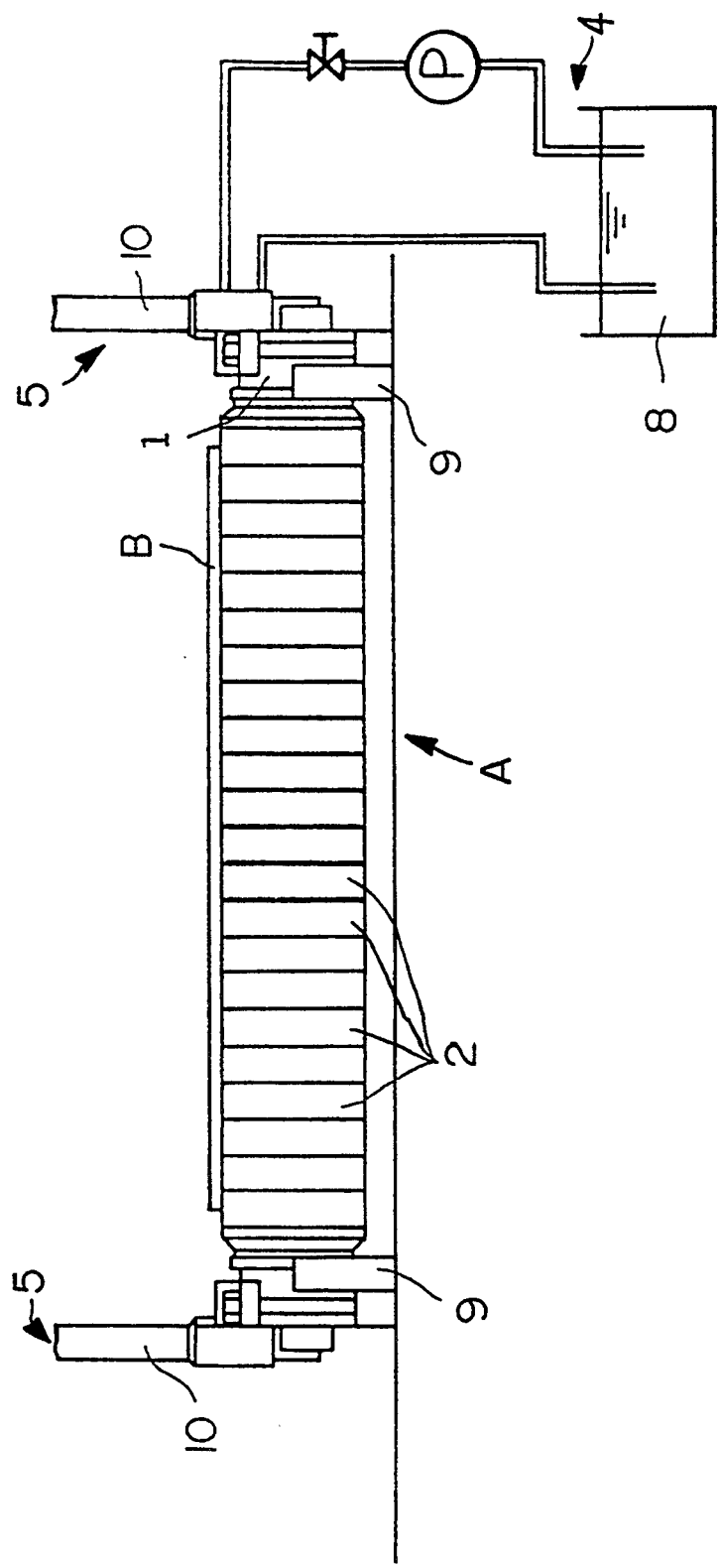
FIG. 1 is a front view of a preferred embodiment of a flatness detector in accordance with the present invention.
Figure 2:
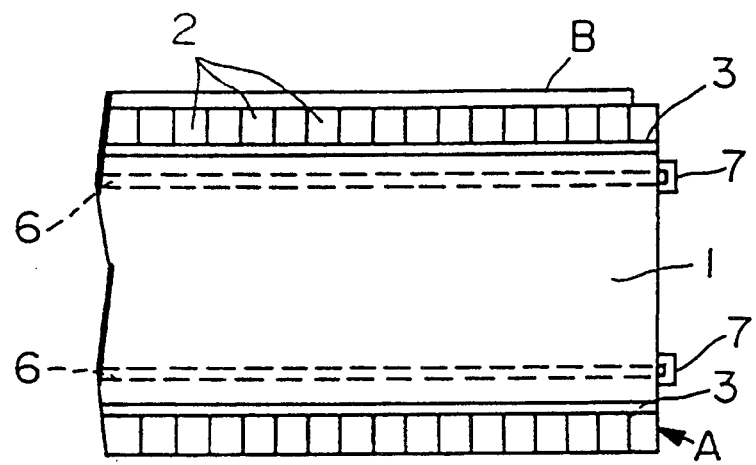
FIG. 2 is a longitudinal vertical section thereof.
Figure 3:
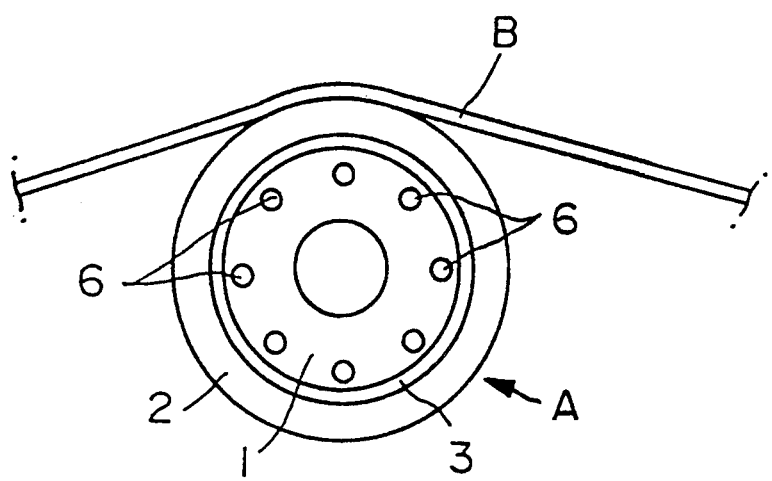
FIG. 3 is a transverse vertical section thereof.

A preferred embodiment of the present invention will be described in conjunction with FIGS. 1 to 3 of the accompanying drawing.

In the drawings, reference characters A and B respectively denote a flatness detector and a strip such as rolled steel. Upon rolling, the strip B contacts a top of the flatness detector A and is predeterminately angled relative to horizontal.

The flatness detector A comprises a fixed shaft 1, a plurality of rotary rings 2, a pneumatic bearing 3, heating means 4 and bending means 5.

The shaft 1 is an axle of the flatness detector A and is supported at its opposite ends by some supporting means.

The rings 2 are rotatably fitted over the shaft 1 in close contact with each other along an axis of the shaft 1. Each ring 2 is coupled to a pressure sensor (not shown) so as to detect any pressure variation, at the very ring 2, of a pneumatic bearing 3 to be described in detail hereinafter.

The pneumatic bearing 3 is defined by a gap between the rings 2 and the shaft 1 which is supplied with compressed air through holes (not shown) of the shaft 1.

The heating means 4 comprises a plurality of through holes 6 extending through the shaft 1 in parallel with each other along the axis of the shaft 1, means 7 for intercommunicating the holes 6 and a heating medium supply 8 for supplying by a pump a liquid P heating medium to the holes 6 and discharging to an exterior and back to the supply 8 the heating medium having passed through the holes 6.

The bending means 5 are at the opposite ends of the shaft 1 and each comprises a support 9 for supporting the shaft 1 at a side opposite to the direction of bending the shaft 1 and a bending bolt 10 arranged outwardly of and at a side opposite to the support 9 for exerting pressing force to tile shaft 1 to bend the same in the predetermined direction.

Next, mode of operation of the flatness detector with the above mentioned structure will be described.

Upon rolling, the compressed air is supplied to the gap between the shaft 1 and the rings 2 to provide tile pneumatic bearing 3. The rings 2 supported by the bearing 3 are caused to rotate by the rolled strip B which is moving downstream. Loads applied from the strip B to the rings 2 are detected in terms of pressure variations in the pneumatic bearing 3 by the pressure sensors (not shown) coupled to the rings 2. In response to the detected pressure variations, widthwise tension distribution of the strip B and hence flatness thereof is detected.

The heating medium from the supply 8 is forced by pump P to flow through the holes 6 extending through the shaft 1 so that the rings 2 are heated by heat transmitted from the shaft 1 and through the pneumatic bearing 3. As a result, temperature difference between the strip B being hot due to rolling on one hand and the rings 2 on the other hand is eliminated and shrinkage of the rolled strip B due to sudden temperature variations is prevented.

In addition, the belts 10 are tightened to bend the shaft 1 about the supports 9 at the opposite ends of the shaft 1 in a convex form toward the strip B. The rings 2 therefore constitute a crown-like contour so that different tensions are exerted to a widthwise middle of the strip B and side edges of the strip B.

Since formation of the lengthwise wrinkles on the strip B is prevented by heating and bending of the flatness detector A as described above, a desired flatness of the strip B is retained in a satisfactory manner even when the strip B passes over the flatness detector A.

Since formation of the lengthwise wrinkles on the strip B is prevented in the manner described above, there is no necessity of increasing the tension imparted upon rolling for the purpose of preventing formation of the lengthwise wrinkles on the strip. As a consequence, breakdown of the strip and lowering of productivity are suppressed.

As compared with the envisaged or contemplated formation of crown on a flatness detector, the flatness detector according to the present invention is simple in manufacture and therefore is advantageous from the standpoints of cost and utility.

It is to be understood that the present invention is not limited to the preferred embodiment described above and that various modifications may be effected without departing from the true spirit of the present invention. For instance, specific design of the heating and/or bending means may be modified as needs demand.

As described above, the flatness detector in accordance with the present invention is provided with heating means and bending means each of which can satisfactorily prevent any formation of the lengthwise wrinkles on the strip so that even when the strip passes over the flatness detector, its flatness can be retained in a satisfactory manner. As a result, there is no need of increasing rolling tension and no breakdown of the rolled strip occurs. The flatness detector in accordance with the present invention can be manufactured in a simple manner at a less cost as compared with the envisaged formation of crown on a flatness detector.

What is claimed is:

1. In a flatness detector having a fixed shaft and a plurality of rotary rings loosely fitted over said shaft and adjacent to each other along an axis of the shaft, a pneumatic bearing being defined by an air gap between said shaft and said rings, the improvement comprising heating means associated with said shaft for heating said shaft and hence said rings through said air gap, and bending means at opposite ends of said shaft for bending said shaft in a predetermined direction.

2. The detector of claim 1 wherein said heating means associated with said shaft includes at least one through hole extending through said shaft parallel to its axis, a fluid heating medium, and a pump for pumping said heating medium from a supply, through said through hole and back to said supply.

3. The detector of claim 2 including a plurality of intercommunicating, parallel through holes through said shaft and wherein said heating medium is a liquid.

* * * * *